Dec. 19, 1967  D. W. KINNEY  3,358,866
MOLDED INSULATION ELECTRICAL BOX
Filed Oct. 19, 1965  3 Sheets-Sheet 1
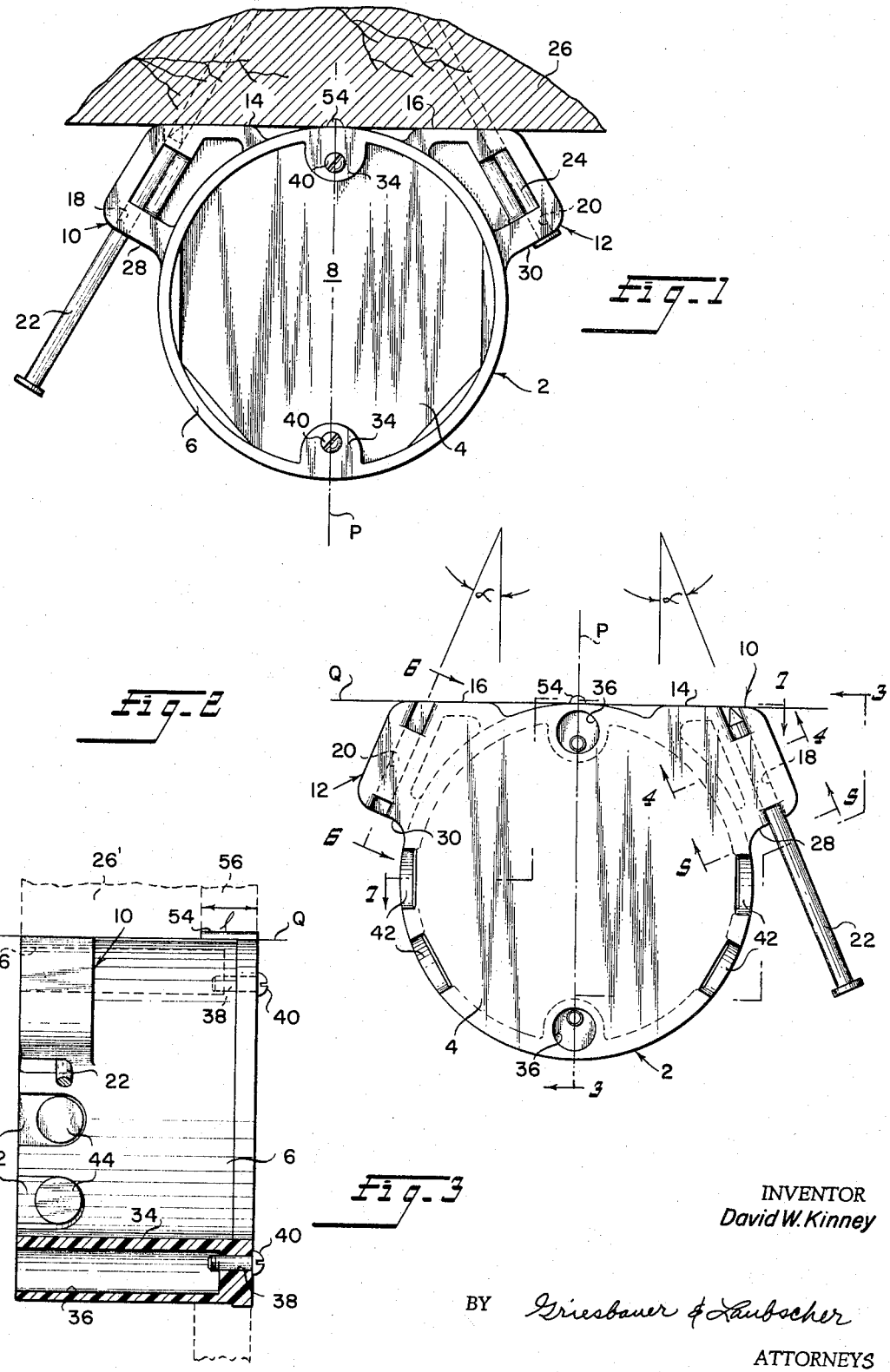
INVENTOR
David W. Kinney
BY Griesbauer & Laubscher
ATTORNEYS Dec. 19, 1967  D. W. KINNEY  3,358,866
MOLDED-INSULATION ELECTRICAL BOX
Filed Oct. 19, 1965  3 Sheets-Sheet 2

INVENTOR
David W. Kinney
BY Griesbauer & Lubocher
ATTORNEYS

Dec. 19, 1967     D. W. KINNEY     3,358,866
MOLDED-INSULATION ELECTRICAL BOX
Filed Oct. 19, 1965     3 Sheets-Sheet 3
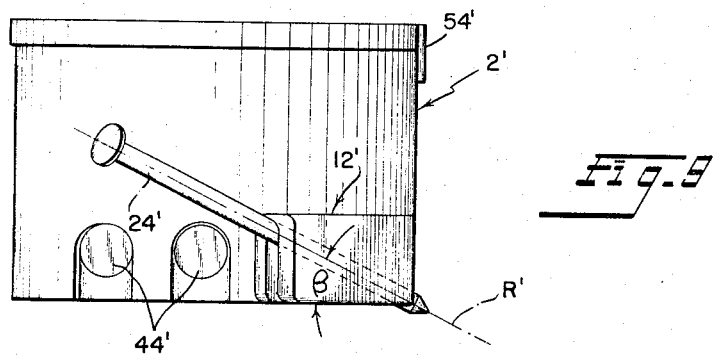
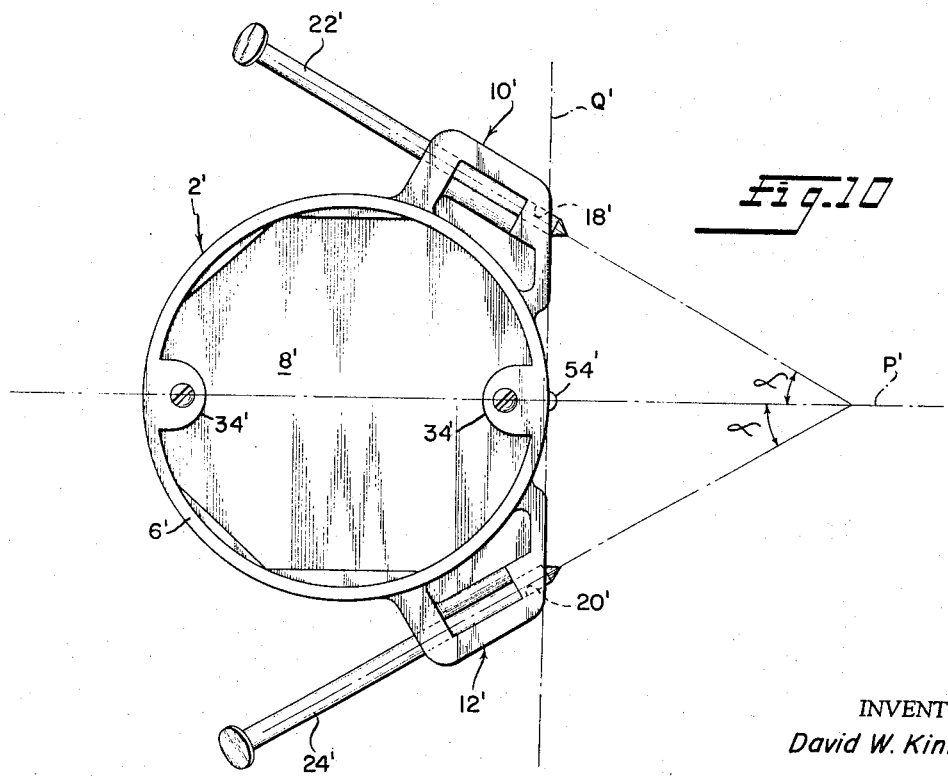
INVENTOR
David W. Kinney
BY Griesbauer & Laubscher
ATTORNEYS United States Patent Office 3,358,866
Patented Dec. 19, 1967

3,358,866
MOLDED INSULATION ELECTRICAL BOX
David W. Kinney, Parkersburg, W. Va., assignor to Union Insulating Company, Inc., Parkersburg, W. Va., a corporation of West Virginia
Filed Oct. 19, 1965, Ser. No. 497,866
5 Claims. (Cl. 220—3.9)

ABSTRACT OF THE DISCLOSURE

A molded insulation electrical wiring box including integral ear portions containing convergent nail-guiding passageways, whereby the box may be readily nailed to a support.

Specification

This invention relates generally to an improved electrical wiring box of the molded insulation type adapted for nailing to a fixed support, and more particularly to an electrical box having a body portion on which are integrally molded a plurality of spaced laterally-extending external ears having coplanar stabilizing surfaces adapted to abut the support, said ears containing nail guiding passageways angularly arranged relative to said stabilizing surfaces for guiding, in an angularly inwardly directed manner, corresponding nails, respectively, during the fastening of the box to the support.

In my prior U.S. Patent No. 3,176,869, issued Apr. 6, 1965, entitled, "Nail-Fastened Insulated Outlet Box," a molded insulation wiring box is disclosed in which the body thereof contains a plurality of parallel nail guiding passageways for guiding a plurality of parallel nails during the fastening of the box to a support with which an external surface of the box is in contiguous engagement. Although this prior box has proven perfectly satisfactory for most installations, in certain cases the relative inaccessibility of the location on the support to which the box is to be fastened renders the nailing of the same most difficult. Furthermore, when the nail guiding passageways are formed in the body portion of the box, it is often difficult for the workman to accurately strike the head of a nail being driven into the support without inadvertently damaging the molded insulation body. Moreover, in view of the parallel arrangement of the passageways and the nails guided thereby, the box is not completely immobilized relative to the support until the nails are fully driven to the point that the nail heads actually engage the adjacent surface of the body portion of the box. Consequently, in the event that a careless workman fails (or due to inaccessibility, is unable) to fully drive the nail into the support, a certain degree of play or movement of the box relative to the support may be present. Furthermore, in the known devices, the use of relatively long nails is required. The present invention was developed to avoid the above and other drawbacks of the known nail-fastened molded insulation electrical boxes.

The primary object of the present invention is to provide a unitary open-topped molded insulation wiring box having integrally molded thereon, on opposite sides of a first plane containing the longitudinal central axis thereof, a plurality of spaced laterally extending stabilizing ears. More particularly, these ears carry coplanar stabilizing surfaces contained in a second plane normal to both said first plane and the bottom of the box, said ears containing nail-guiding passageways extending from said stabilizing surfaces at a common acute angle relative to said first plane. Generally, these nail-guiding passageways are coplanar and lie in a third plane parallel with, or arranged at a converging acute angle relative to, the plane of the bottom of the box. Owing to the external arrangement of the ears, the chamber contained within the body is unobstructed and may be of relatively large size.

A further object of the invention is to provide an electrical box of the type described above having nail head engaging surfaces on the sides of said laterally-extending ears opposite said coplanar stabilizing surfaces, said nail head engaging surfaces being normal to the aforementioned angularly-arranged nail receiving passageways, whereby angularly arranged nails of relatively short length may be readily driven into the support until the nail heads engage the corresponding ear surfaces and thereby rigidly fasten the box in place.

Although the location of the ears is not critical, according to a further object of the invention, the ears are arranged adjacent the bottom of the side wall portion of the molded body, and integral projection means are carried by said side wall portion adjacent the top edge thereof and extend laterally outwardly from said body beyond said second plane. The projection means carry a transverse stop surface parallel with the bottom wall and spaced from said ears, said stop surface being adapted to engage a corner or edge surface of the support to place said body in a nailing position in which the free top edge thereof is spaced a predetermined distance from the support.

In accordance with preferred embodiment of the invention, the box body is of a cylindrical construction and the aforementioned first plane containing said stabilizing surfaces is adjacent and preferably coplanar with the outermost extremity of that portion of the body side wall contained between said ears. Consequently, a longitudinal surface of the side wall portion of the box may also engage the support and thereby stabilize the box during the nailing of the same to the support.

Other objects and advantages of the invention will become apparent from a study of the following specification when considered in conjunction with the accompanying drawing, in which:

FIGURE 1 is a top plan view illustrating the manner in which the preferred cylindrical embodiment of the electrical outlet box of the present invention is nailed to a support;

FIGURE 2 is a bottom view of the box of FIGURE 1 and illustrates one nail captively held in a nail guiding passageway;

Figure 8:
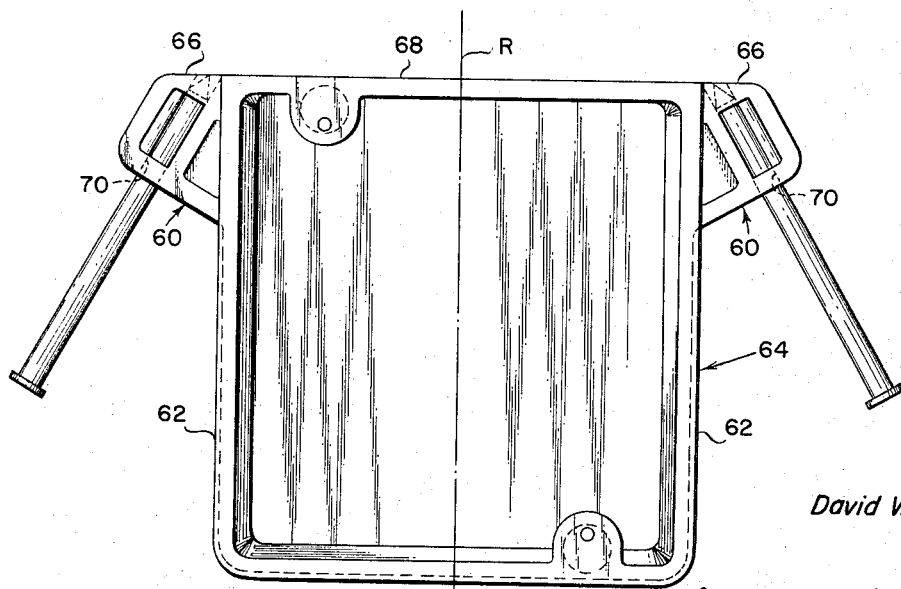

FIGURES 3, 4, 5, 6 and 7 are sectional views taken along lines 3—3, 4—4, 5—5, 6—6 and 7—7, respectively, of FIGURE 2;

FIGURE 8 is a top plan view illustrating a non-cylindrical outlet box embodiment of the invention; and FIGURES 9 and 10 are side elevation and top plan views, respectively, of a modification of the embodiment of FIG. 1.

Referring first more particularly to FIGURES 1–7, the electrical wiring or outlet box 2 is molded from a suitable molded insulating material (for example, a synthetic plastic resin of the phenolic, epoxy, vinyl or urea type) and includes a bottom wall 4 and a cylindrical side wall 6 defining a chamber 8. Integrally carried by the external surface of the side wall 6 adjacent the bottom wall 4, and arranged on opposite sides of a first plane P containing the longitudinal central axis of the body 2, are a pair of ears 10 and 12 having coplanar stabilizing surfaces 14 and 16, respectively, arranged in a second plane Q normal to both the first plane P and the plane of the bottom wall 4. As shown in FIGURE 2, the second plane Q is adjacent and preferably coplanar with the outermost portion of that part of the external surface of the side wall contained between the ears 10 and 12.

The ears 10 and 12 contain coplanar nail guiding passageways 18 and 20, respectively, arranged at a common acute angle "α" (FIGURE 2) relative to the first plane P, said passageways being operable to guide a pair of nails 22 and 24, respectively, during the nailing of the box to a wooden support 26 as shown in FIGURE 1. On the sides thereof opposite the stabilizing surfaces 14 and 16 that abut the adjacent surface of support 26, the ears 10 and 12 are provided with nail head engageable surfaces 28 and 30 normal to the axes of the nail guiding passageways 18 and 20, respectively.

Extending longitudinally of chamber 8 on the inner surface of the side wall 6 are a pair of diametrically opposed integral ribs 34 that include bores 36 extending upwardly from the bottom of the body 2 as shown in FIGURES 2 and 3. At their upper ends, the bores 36 communicate with smaller threaded through bores 38 that receive screws 40 by means of which a conventional electrical component (such as a switch, outlet receptacle or the like) is mounted in spaced insulated relationship relative to the nails 22 and 24. Adjacent its lower edge the side wall 6 contains a plurality of recesses 42 containing conventional knock-out plugs 44, which, when removed, afford access openings by means of which the electrical conductors leading to the electrical device may be introduced into chamber 8.

Figure 4:
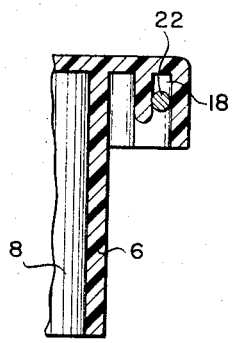
Figure 5:
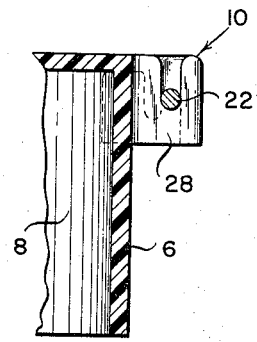
Figure 6:
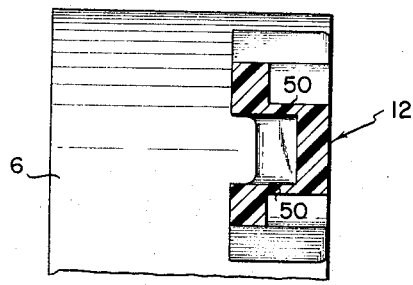
Figure 7:
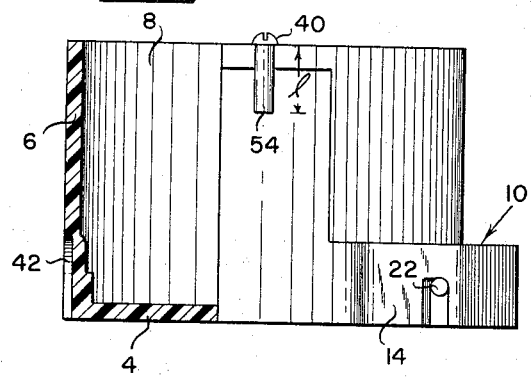

The nail receiving passageways are formed in the ears 10 and 12 as shown in FIGURES 4–6. As disclosed in my prior U.S. Patent No. 3,176,869 that issued on Apr. 6, 1965, these passageways are formed by simple molding apparatus in which the two die parts of the mold have only relative linear movement, and no laterally movable molding parts are required. As disclosed in the aforementioned patent, thin films or flashes 50 (FIGURE 6) are provided, which, when pierced by a nail inserted within the passageway, maintain the nail captive prior to nailing as shown in FIGURE 2.

In order to properly arrange the body relative to an edge or corner of a support prior to the nailing of the box thereto, an integral lug 54 is provided adjacent the upper edge of the outer surface of the side wall 6, said lug lying in the first plane P between the ears 10 and 12 and extending downwardly toward the bottom of the box. The lug 54 has a given length "l" and terminates at its lower end in a flat stop surface spaced from the bottom wall of the box. The lug has such a thickness that it extends laterally beyond the second plane Q, whereby when said body is arranged with the stop surface of the lug 54 in engagement with a corner surface of a support 26' (as shown in phantom in FIGURE 3), the free edge of the side wall 6 is spaced the distance "l" from the support. Thus, in the case where the outlet box is initially secured to a support (i.e., a stud or joist) and a wall board 56 or the like (containing an opening receiving the box) is subsequently mounted about the box and is secured to the support, the edge of the box will be flush with the exposed face of the wall board as shown in FIGURE 3.

Referring again to FIGURE 1, it will be seen that owing to the acute angular relationship of the passageways 18 and 20 relative to the stabilizing surfaces 14 and 16 that abut the support 26, the body 2 will be relatively rigidly fastened to the support as soon as both nails are initially partially driven into the support. Consequently, when the box is arranged with the projection 54 in cooperative engagement with the corresponding edge of the support 26 as shown in FIGURES 1 and 3, each nail is initially tapped to properly orient the box relative to the support, whereupon the nails may be rapidly driven, by full hammer strokes, to the position in which the nail heads engage the surfaces 28 and 30, respectively.

The present invention is applicable also to molded insulation boxes having non-circular cross-sectional configurations. Referring now to the square box embodiment shown in FIGURE 8, the ears 60 may be integrally molded with portions of opposed side walls 62 of the box 64, said ears having stabilizing surfaces 66 coplanar with the external surface of the side wall 68 that abuts the support, and nail guiding passageways 70 angularly arranged at the same acute angle relative to the central longitudinal plane R normal to the side wall 68.

In the embodiments of FIGURES 1 and 8, the nail guiding passageway lie in a common plane parallel with the plane of the bottom wall of the box. However, as shown in the embodiment of FIGURES 9 and 10, the nail guiding passageways 18' and 20' may be so arranged in the ears 10' and 12' that the nails 22' and 24' will lie in a common plane R' that is inclined at an acute angle "β" with the plane containing the bottom wall of the box. As in the embodiment of FIGURE 1, the nails converge at a common angle "α" to plane P' containing the longitudinal central axis of the box. In all remaining regards, the electrical box of FIGS. 9 and 10 is identical to the cylindrical embodiment of FIG. 1, like parts being identified with primed reference numerals.

While in accordance with the provisions of the patent statutes I have illustrated and described the best forms and embodiments of the invention now known to me, it will be apparent to those skilled in the art that various changes and modifications may be made in the apparatus described without deviating from the invention set forth in the following claims.

What is claimed is:

1. A unitary molded plastic electrical wiring box adapted for nailing to a support, comprising
    an open-topped body molded of insulating material and having bottom and side wall portions defining in said body a chamber, said body having integrally molded therewith on opposite sides of a first plane containing the longitudinal central axis of said body a pair of laterally extending ears extending outwardly from the external surfaces of said side wall portions, said ears each having a thickness less than half the height of said body and being arranged adjacent the bottom wall portion of said body, said ears having also flat coplanar stabilizing surfaces lying in a second plane normal both to said first plane and to the plane containing said bottom wall portions, the external surface of said body side wall portion containing the intersection of said first and second planes, said ears having molded therein nail guiding passageways lying in a third plane and arranged at a common acute angle to and on opposite sides of said first plane, whereby when said body is arranged with the ear stabilizing surfaces in contiguous engagement with the support and nails guided by said passageways are angularly driven into the support, said body is rigidly attached to said support.

2. Apparatus as defined in claim 1 wherein said body has a generally cylindrical configuration.

3. Apparatus as defined in claim 1, and further wherein said body side wall portion includes on the external surface thereof an integral lateral projection extending outwardly beyond said second plane and longitudinally of the intersection of said first and second planes, said projection extending rearwardly from the front edge of the body a distance less than one half the height of the body, said projection having on its lower end a stop surface parallel with and spaced upwardly from said body bottom wall portion.

4. Apparatus as defined in claim 1 wherein said third plane is parallel with the plane containing the bottom wall of said body.

5. Apparatus as defined in claim 1 wherein said third plane converges at an acute angle with the plane containing the bottom wall of said body.

References Cited

UNITED STATES PATENTS

| 691,874 | 1/1902 | Robinson | 220—3.9 |
| 1,262,988 | 4/1918 | Sieffert | 220—3.9 |
| 3,040,926 | 6/1962 | Palmer | 220—3.9 |
| 3,176,869 | 4/1965 | Kinney | 220—3.9 |

DONALD F. NORTON, *Primary Examiner.*

JAMES R. GARRETT, *Examiner.*